United States Patent [19]
Driggers

[11] Patent Number: 6,134,985
[45] Date of Patent: Oct. 24, 2000

[54] SYSTEM AND METHOD FOR MOUNTING A CONTROL CABLE TO A TRIGGER OR LEVER ARM ACTUATOR

[76] Inventor: Bernard Driggers, 1517 E. 86th St., South Wichita, Kans. 67233

[21] Appl. No.: 09/203,835

[22] Filed: Dec. 2, 1998

[51] Int. Cl.[7] .................. F16C 1/14; F16C 1/18
[52] U.S. Cl. .......................... 74/502.5; 74/502.2
[58] Field of Search .................. 74/502.5, 501.6, 74/502, 502.2, 502.4, 502.6, 501.5 R

[56] References Cited

U.S. PATENT DOCUMENTS

| | | |
|---|---|---|
| 3,416,389 | 12/1968 | Conrad et al. ............................ 74/502 |
| 3,426,613 | 2/1969 | Conrad ...................................... 74/501 |
| 4,813,214 | 3/1989 | Barnard et al. ..................... 74/502.2 X |
| 5,152,944 | 10/1992 | Khalil ...................................... 264/135 |
| 5,758,546 | 6/1998 | Taomo et al. ...................... 74/502.2 X |

*Primary Examiner*—Mary Ann Green
*Attorney, Agent, or Firm*—Jenkens & Gilchrist

[57] ABSTRACT

A control cable actuator assembly for use on a piece of equipment includes a molded trigger or a lever assembly. The end of a control cable is injection molded into the trigger or lever. Optionally, the control cable actuator assembly may include a cam surface for contacting the control cable that has been molded into the trigger or lever assembly.

23 Claims, 2 Drawing Sheets

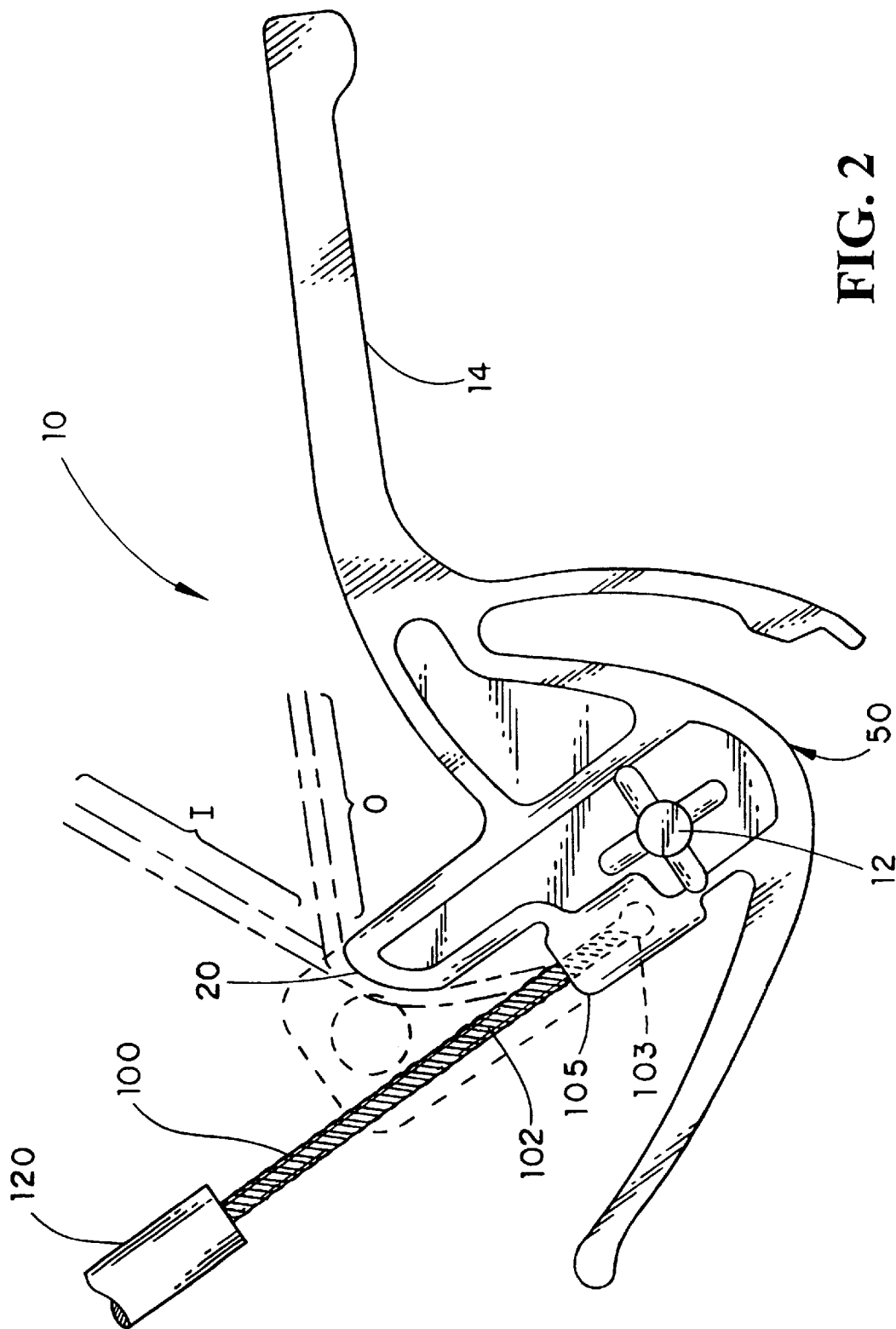

SYSTEM AND METHOD FOR MOUNTING A CONTROL CABLE TO A TRIGGER OR LEVER ARM ACTUATOR

FIELD

The present invention pertains to cables; more particularly, the present invention pertains to cables whose movement is actuated by triggers or levers. While the following invention will be explained in the context of its use on power equipment, those of ordinary skill in the art will appreciate that it has applicability wherever control cables are used, such as in automobiles to control the opening of the hood over the engine or the trunk lid or furniture such as adjustable recliners.

BACKGROUND

For many pieces of power equipment where the speed of the engine or engagement of the power train is controlled by the movement of a control cable, there is often the problem of the control cable becoming loose from or "walking off" a pivotably mounted trigger or a lever arm actuator. This loosening problem has traditionally been solved by adding additional connecting structure at the end of the control cable to assure that the end of the control cable remains securely connected to the trigger or lever arm actuator. Such additional connecting structures have included "Z's," barrels and pockets, eyes and posts, slugs, or similar hardware to assure the security of the mechanical connection of the control cable to the trigger or lever arm actuator. These pieces of hardware are swagged or die cast on the end of the control cable to "lash up" to a trigger or lever arm actuator. While effective in holding the control cable to the trigger or lever arm actuator, the additional connecting hardware causes a small radius bend to occur in the control cable when a load is applied. This small radius bend in the control cable is due to frictional forces which do not allow the connecting structure of the control cable to pivot immediately within the lash up area when the lash up portion of a trigger is rotated through its arc about the trigger pivot point. A small radius bend in the control cable rapidly fatigues the control cable and will eventually alter the operating length of the control cable which then changes tolerance stack-up in the system. Such changes in tolerance stack-up due to an altered operating length and normal tolerance requirements of the lash up of multiple components can impede equipment performance and may even affect operator safety.

In some pieces of power equipment, the fatigue associated with the repeated bending movement of a stranded-wire control cable through a small radius bend becomes a significant problem as individual strands within the control cable break thus weakening the stranded wire control cable. To minimize or effectively eliminate this weakening of the control cable, it is desirable to spread the bend of the control cable over a larger area and over a larger bend radius to minimize or effectively eliminate the breakage of individual wires in the control cable.

In other pieces of power equipment the on-going effort of manufacturers to reduce both size and weight causes problems because of the additional connecting structure needed to assure a firm connection of the trigger with its associated control cable. This effort to reduce size and weight creates the need to provide a solid connection between control cables and their associated trigger or lever assemblies in a smaller space with fewer parts and less plastic material.

Accordingly, there remains a need in the art to provide a system and method for securely mounting a control cable to a trigger or lever arm actuator on power equipment which will reduce control cable fatigue, minimize weakening of the control cable and occupy less space with less weight.

SUMMARY

The system and method of the present invention for mounting a control cable to a trigger or lever arm actuator, used on power equipment to control speed of the engine or engagement of the drive train, reduces control cable fatigue, minimizes strand breakage in stranded wire control cable, while at the same time being lighter and occupying less space than prior art control cable to trigger mounting systems. In addition, the system of the present invention eliminates the problem of the end of control cable "walking off" its mounting to a trigger or a lever arm actuator. The reduction in control cable fatigue, minimization of individual wire breakage in stranded wire control cable, and elimination of the problem of "walking off" is accomplished by molding the trigger or lever arm actuator assembly directly on to the end of the control cable. The trigger or lever arm actuator assembly itself will typically be pivotably mounted to enable its arcuate movement and impart quasi-linear movement to the control cable when finger pressure is placed on the trigger or lever arm actuator assembly.

In the present invention, an enlarged portion on the end of a control cable, called a "bird cage" when a stranded control cable is used, is molded into the trigger or lever assembly at a sufficient depth to provide enough plastic material around the end of the control cable so that it will not pull out of the trigger or lever arm. To facilitate arcuate movement of the control cable, the control cable to trigger mounting system and method of the present invention may also include an integral cam surface. This integral cam surface is positioned to contact and support the control cable near its exit from the molded plastic when the trigger or lever arm actuator assembly is used to move the control cable by rotating the trigger or lever arm actuator about its pivot point.

BRIEF DESCRIPTION OF THE DRAWINGS

A better understanding of the control cable to trigger mounting system and method of the present invention may be had by reference to the drawings wherein:

FIG. 2 is an enlarged side elevational view of the preferred embodiment of the control cable to trigger mounting system of the present invention.

BRIEF DESCRIPTION OF THE EMBODIMENTS

Figure 1:
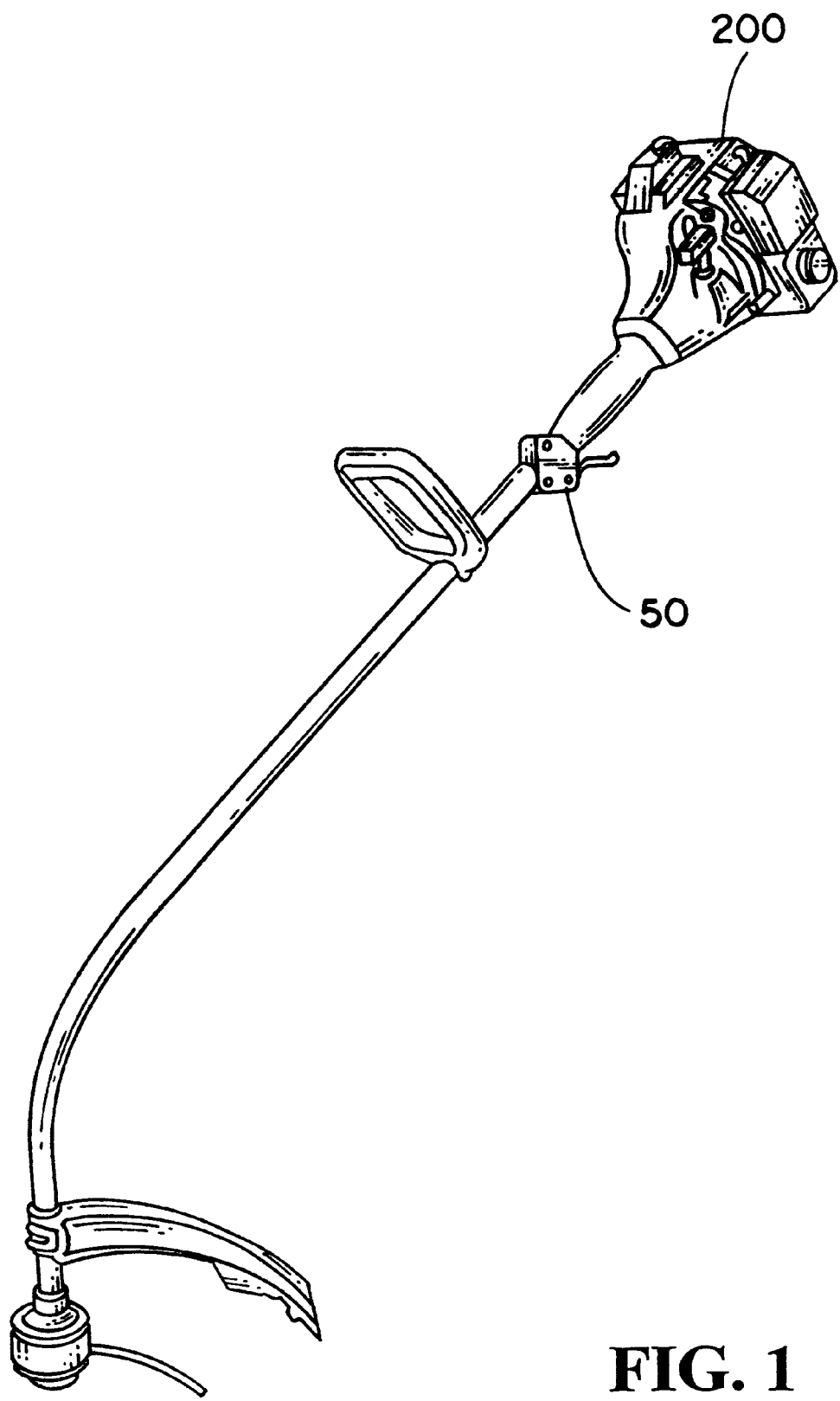
FIG. 1 is a perspective view of a piece of power equipment, specifically a string trimmer, illustrating a typical location for the trigger or lever arm actuator to control cable mounting system of the present invention connected to the carburetor on a small engine.

The control cable to trigger mounting system 10 of the present invention is a combination of a control cable 100 and a molded trigger or lever arm actuator assembly 50. The control cable 19 may be a stranded wire rope, a solid wire, or a non-metallic material such high-strength Nylon® or Kevlar® cord. The molded trigger or lever arm actuator assembly 50, generally made of plastic, includes a pivot 12 which allows the trigger or lever arm actuator 14 to rotate about its pivot 12 when acted upon finger pressure. In the description which follows, the term "trigger" will be used to describe either a trigger or a lever arm actuator.

As shown in FIG. 1, the control cable assembly 10 of the present invention is typically used on a piece of power equipment 200 which use a trigger assembly 50 to control the carburetor setting to regulate engine speed. While a line trimmer 200 is shown in FIG. 1, it will be understood by those of ordinary skill in the art that the present invention may be used with a variety of different pieces of power equipment; not necessarily just a line trimmer 200. Such pieces of equipment may be powered by a variety of different sources to include at least gasoline engines, electric motors, air motors, and hydraulic or fluid power motors.

In addition, the present invention also has utility wherever a control cable and trigger or lever arm connection is used such as in seat adjustment in automobiles or in moving portions of home furniture such as adjustable recliners.

As shown in FIG. 2, the control cable assembly 10 includes a control cable 100 which may be a stranded wire rope, a solid wire, or a non-metallic cord. If required, the control cable assembly 10 may optionally include a sheath 120. A first end 102 of the control cable 100 having an enlarged portion 103 is molded in a plastic trigger assembly 50. The enlarged portion 103 in stranded wire rope is often called a "bird cage." The plastic trigger or lever rotates about a pivot point 12. The second end of the control cable includes a suitable fitting for connecting to whatever is to be moved; for example, a lever on a carburetor, a bell crank, a plunger, another control cable, a latch mechanism, or a rotary control. Such fittings are well known in the prior art and typically are eyes, hooks, etc. Molding of the control cable 100 directly into the plastic trigger assembly 50 does not include any type of additional reinforcement for the connection between the control cable and the trigger or lever assembly 50. All that is required is that the end of the control cable 103 be surrounded by a sufficient amount of plastic material so that it will not pull out of the plastic material. As shown in FIG. 2, the end of the control cable 103 is approximately two control cable end 103 diameters from the surface 105 where the control cable 100 exits the plastic material.

By moving the trigger 14 with finger pressure, the control cable 100 is caused to move. For example, and as shown in FIG. 2, one position "I" may be associated with an idle condition of the engine utilized on a piece of power equipment. Another position of the control cable assembly, designated by the letter "O" may be for when the throttle of the engine on a piece of power equipment is in its wide open position.

To facilitate movement of the control cable 100 with respect to the trigger and to reduce fatigue, or minimize strand breakage in stranded wire rope, a cam surface 20 may be provided. This cam surface 20 spreads the control cable bending stresses over its comparatively larger radius as the control cable is moved from one position to another. The cam surface 20 may be formed integrally with the trigger 14. Manufacture of the system of the present invention may be accomplished by placing the end of the control cable 100 in a mold, forming the plastic trigger or lever arm actuator assembly 50 about the end of the control cable and removing the control cable and trigger or lever arm actuator assembly from the mold.

It has been found that by use of the system and method for mounting a control cable to a trigger, of the present invention, the following advantages are obtained:

a. Elimination of material and labor to swage or die cast an additional fitting onto the end of the control cable for reinforcement of the attachment to a mating fitting on a trigger or lever arm actuator assembly.

b. A reduction in the amount of plastic material used in the trigger or lever arm actuator assembly as no special additional control cable connecting structure is required.

c. A reduction in the size and weight of the trigger or lever arm actuator assembly because of the elimination of a molded connecting structure to mechanically retain the control cable end fitting to the trigger or lever arm actuator and elimination of associated tolerances/stack ups resulting from the connecting structures.

d. Increased linear control cable travel in the trigger or lever arm actuator assembly can be accomplished if desired because of the reduction in size of the trigger or lever arm actuator assembly and tolerance elimination.

e. An increase in space available to increase the radius of control cable bend in the trigger assembly mounting space.

f. Elimination of problem of maintaining retention of the control cable end fitting attachment or "lash up" to the input trigger assembly because the molded control cable will stay in place whereas die cast control cable end fittings have a tendency to "walk out" of a pocket and barrel connection or walk off an eye and post connection.

g. Labor required to attach or "lash up" a control cable end fitting to a trigger assembly is eliminated.

h. The overall number of parts in a piece of power equipment is reduced as the control cable and trigger assembly become one part.

i. Stranded wire control cable life is increased due to a reduction in the bending stresses on the individual wires in the control cable whereas control cable end fittings which are attached or lashed to a trigger assembly must perform imperfect or tight radius rotations under load causing the stranded wire control cable to bend in a very localized area near the end fitting.

j. Control cable conforms easily to a curved molded surface which enables spreading through its contact with and support of the control cable bending stresses over a longer length of control cable. This spreading of the control cable bending stresses enables the control cable to carry higher loads and also results in a longer service life.

While the present invention has been illustrated with respect to its preferred embodiment, it will be understood by those of ordinary skill in the art, that numerous other embodiments of this invention may be utilized once the advantages and features of the disclosed preferred embodiment have been understood.

I claim:

1. A unitary control cable and trigger assembly comprising:

a control cable having an enlarged portion formed on one end thereof;

a pivotably mounted trigger permanently affixed to said control cable by completely enclosing said enlarged portion within said pivotably mounted trigger.

2. The unitary control cable and trigger assembly as defined in claim 1 wherein the enlarged portion on the end of said control cable is insert molded within said pivotably mounted trigger.

3. The unitary control cable and trigger assembly as defined in claim 1 wherein said control cable is stranded wire rope.

4. The unitary control cable and trigger assembly as defined in claim 1 wherein said control cable is a solid wire.

5. The unitary control cable and trigger assembly as defined in claim 1 wherein said control cable is a non-metallic high strength cord.

6. The unitary control cable and trigger assembly as defined in claim 1 further including a cam surface in close proximity to the point where said control cable exits said pivotably mounted trigger.

7. The unitary control cable and trigger assembly as defined in claim 6 wherein said cam surface is formed integrally with said pivotably mounted trigger.

8. A unitary control cable and trigger actuator system for use on a piece of power equipment, said unitary control cable and trigger actuator assembly comprising:
  a plastic trigger assembly constructed and arranged to enable movement of said plastic trigger assembly about a pivot;
  a control cable having a first end and a second end;
  said first end of said control cable having an enlarged portion formed thereon;
  said enlarged portion of said control cable being completely enclosed by said plastic trigger assembly;
  said second end of said control cable including means for attachment to the piece of power equipment.

9. The unitary control cable and trigger actuator system as defined in claim 8 wherein said first end of said control cable is insert molded within said plastic trigger assembly.

10. The unitary control cable and trigger actuator system as defined in claim 8 wherein said control cable is stranded wire rope.

11. The unitary control cable and trigger actuator system as defined in claim 8 wherein said control cable is a solid wire.

12. The unitary control cable and trigger actuator system as defined in claim 11 wherein said control cable is a non-metallic high strength cord.

13. The unitary control cable and trigger actuator system as defined in claim 8 further including a cam surface in close proximity to the point where said control cable exits said plastic trigger assembly.

14. The unitary control cable and trigger actuator system as defined in claim 13 wherein said cam surface is formed integrally with said plastic trigger assembly.

15. A piece of power equipment comprising:
  a mechanism having at least one adjustable feature;
  means for connecting said at least one adjustable feature on said mechanism to a unitary control cable and trigger assembly;
  said unitary control cable and trigger assembly including:
    a control cable having an enlarged portion formed on one end thereof;
    a trigger molded to said control cable and completely enclosing said enlarged portion without additional reinforcing of said control cable to trigger connection;
    means for pivotably mounting said trigger.

16. The piece of power equipment as defined in claim 15 wherein said unitary control cable and trigger assembly is formed by molding said enlarged portion of said control cable within said trigger.

17. The piece of power equipment as defined in claim 15 wherein said control cable is stranded wire rope.

18. The piece of power equipment as defined in claim 15 wherein said control cable is a solid wire.

19. The piece of power equipment as defined in claim 15 wherein said control cable is a non-metallic high strength cord.

20. The piece of power equipment as defined in claim 15 further including a cam surface in close proximity to the point where said control cable exits said trigger.

21. The piece of power equipment as defined in claim 20 wherein said cam surface is formed integrally with said trigger.

22. A method for controlling the operation of one or more adjustable portions of a mechanism on a piece of equipment, said method comprising the steps of:
  causing an integral control cable and trigger assembly to pivotably move in response to finger pressure whereby movement of said integral control cable trigger or lever assembly is caused to move together by a molded connection between said trigger or lever and said control cable, said molded connection completely enclosing an enlarged portion on the end of said control cable;
  transferring said movement of said unitary control cable and said trigger or lever assembly to said one or more adjustable portions of the mechanism on the piece of equipment;
  whereby the operation of the piece of equipment is controlled by finger pressure on said unitary control cable and trigger or lever assembly.

23. The method as defined in claim 22, wherein the step of transferring said movement of said unitary control cable and trigger or lever assembly to said one or more adjustable features of the mechanism on the piece of equipment includes causing said control cable to contact a cam surface.

* * * * *